Figure 1:
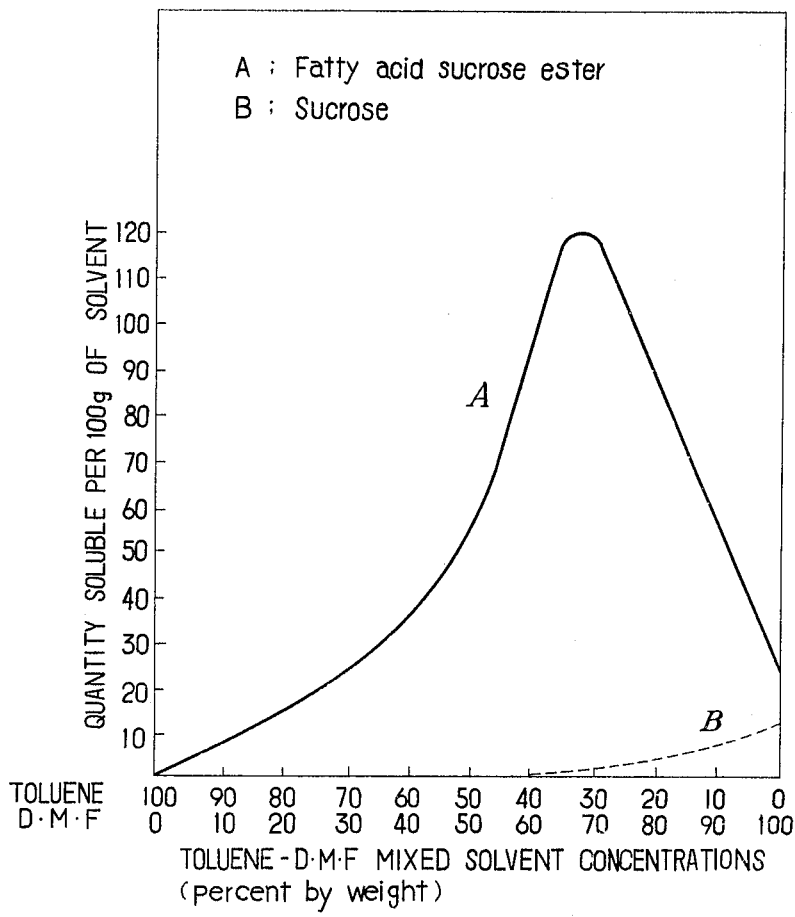

SOLUBILITY CURVES OF FATTY-ACID SUCROSE ESTER (60% MONOESTER, 40% DIESTER) AND SUCROSE, AT 30°C

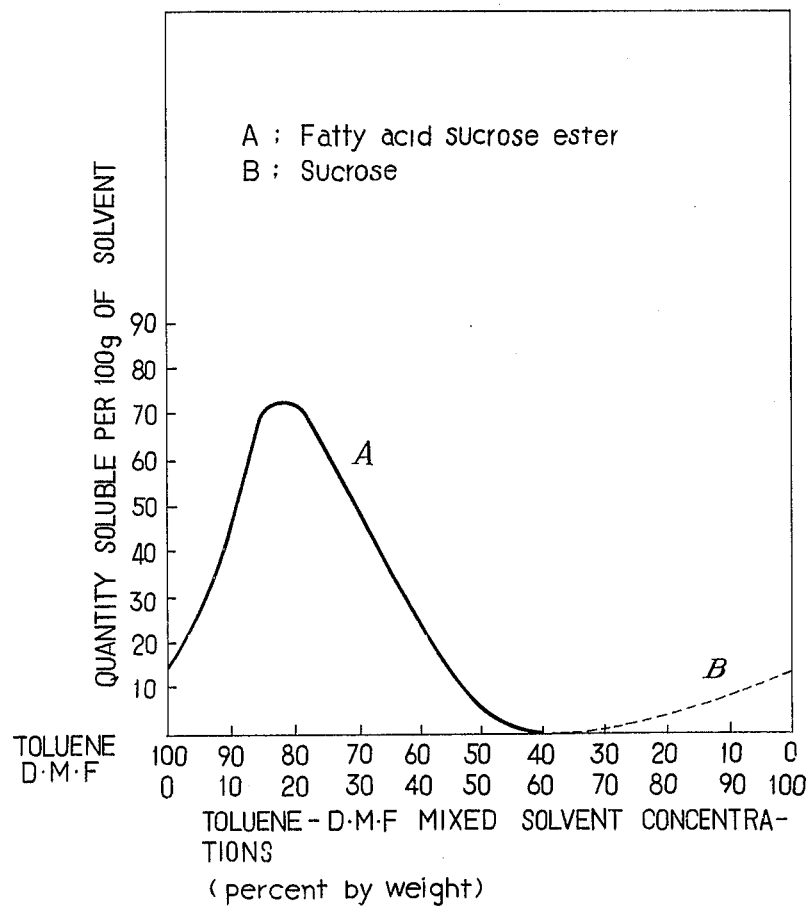

United States Patent Office 3,231,562
Patented Jan. 25, 1966

1

3,231,562
PROCESS FOR RECOVERING UNREACTED SUCROSE FROM REACTION SOLUTION OF FATTY ACID SUCROSE ESTER
Shigeru Mori, Tokyo, Japan, assignor to Dainippon Seito Kabushiki Kaisha, Tokyo, Japan, a joint-stock company of Japan
Filed Aug. 22, 1962, Ser. No. 218,785
Claims priority, application Japan, May 21, 1959, 34/15,961
3 Claims. (Cl. 260—234)

The present invention relates to process for recovering unreacted sucrose from reaction solution of fatty acid sucrose ester. This application is a continuation-in-part of my copending application Ser. No. 9,119 filed February 16, 1960 and now abandoned.

This invention relates to the production of sucrose, and more particularly it relates to a new and improved method of recovering unreacted sucrose from a reaction solution of fatty acid sucrose ester.

It is an object of this invention to provide a new and improved process for the recovery of unreacted sucrose from a reaction solution of fatty acid sucrose ester whereby to obtain a high recovery yield of the said unreacted sucrose.

It is another object of this invention to provide such a new and improved process which is industrially economical.

It is still another object of this invention to provide such a new and improved process which does not entail the difficulties and disadvantages of the processes utilized or proposed heretofore, three of which will be described briefly later for the purpose of illustrative comparison.

The objects of this invention may be achieved, in general, by adding toluene to a reaction solution composed of a fatty acid sucrose ester, unreacted sucrose, dimethylformamide, a catalyst, and some other substances, while the said reaction solution is so maintained at a certain temperature that the gravimetric ratio between the said dimethylformamide and toluene is a certain value; crystallizing out the unreacted sucrose; and separating out the same.

Detailed research by Foster, D. Snell and others have been conducted on the method of producing fatty acid sucrose ester by the alcoholysis reaction resulting from the heating of sucrose and an alcohol ester of a higher fatty acid in a solvent such as dimethylformamide in the presence of an alkaline catalyst such as potassium carbonate, for example, as reported in the journal "Industrial and Engineering Chemistry," vol. 48, p. 1459 and U.S. Patent No. 2,893,990.

Since the said reaction is ordinarily accomplished with the addition of an excess of sucrose of two to three times by molar ratio with respect to the higher fatty acid, it is necessary to separate the produced fatty acid sucrose ester and to make the unreacted sucrose remain.

A few of these separation methods of the prior art may be outlined as follows:

(A) The method which comprises: adding a catalyst and a large quantity of acetone to a reaction solution containing fatty acid sucrose ester and unreacted sucrose and separating out the sucrose by precipitation.

(B) The method which comprises: evaporating to dryness the reaction solution containing fatty acid sucrose ester and unreacted sucrose, etc., and extracting the fatty

2 acid sucrose esters by means of an organic solvent such as xylene, ethylene dichloride, and propanol and then separating the sucrose.

(C) The method which comprises: dissolving the solid mixture obtained from the reaction solution of the method (B) above in butanol, and salting out with saturated sodium chloride to recover the sucrose.

If the above three methods are to be adapted to industrial processes, they entail the following disadvantages, which have been recognized. By the method of (A), it is necessary to add a quantity of acetone which is equal to or greater than that of the reaction solution, and, furthermore, the recovery yield of sucrose is insufficient (recovery yield: 70 to 80%). By the method of (B), the resulting solution is the suspension of extremely fine particles of sucrose or of a viscous solid, which are extremely difficult to separate out by such ordinary methods as the centrifugal method or the filtration method. By the method of (C), the separation is relatively thorough, but an emulsified condition is often developed between the water layer and solvent layer by the surface-active properties of the fatty acid sucrose ester, and separation becomes impossible.

I have discovered that unreacted sucrose can be easily, and completely separated when toluene is added to the final reaction solution of sucrose ester.

In accordance with said discovery, I have succeeded in avoidance of the above-mentioned disadvantages of the prior conventional methods by the present invention.

The process of the present invention relates to a method of recovering sucrose from the reaction solution containing sucrose-mono-ester, sucrose-di-ester, sucrose-higher-esters, free sucrose, an alkaline catalyst and a solvent, which is prepared by the reaction of sucrose (1-3 mol) with methyl-fatty-acid-esters containing from 6 to 30 carbon atoms in the fatty acid moiety in the presence of a catalyst (such as potassium carbonate 0.03-0.04 mol) in dimethylformamide, at a temperature of 60°-120° C., in a vacuum while, with the progression of the reaction, and distillation of the methyl alcohol and dimethylformamide, characterized by adding toluene to said reaction solution in a quantity comprising between 20-95 percent by weight of the dimethylformamide, while said solution is maintained at a temperature of between 10°-100° C., thereby causing crystallyzation of the sucrose, and thereafter separating the sucrose from the mixture by ordinary separation method.

The details of this process will be more clearly apparent by reference to the following detailed description and examples when taken in connection with the following tables and accompanying drawings in which:

Table 1 shows numerical values of the solubilities, at 30° C., of sucrose ester composed of 60% monoester and 40% diester by weight, and of sucrose in a variously mixed solvent composed of dimethylformamide (which, hereinafter, shall be referred to as D.M.F.) and toluene.

FIG. 1 is a graphical representation of the numerical values of Table 1.

Table 2 shows numerical values of the solubilities, at 30° C., of sucrose ester, which is a mixed ester of diester and triester, and of sucrose in a variously mixed solvent composed of D.M.F. and toluene.

FIG. 2 is a graphical representation of the numerical values of Table 2.

TABLE 1

| D.M.F. and Toluene Mixture Percentages | | Sucrose Ester Solubility (60% Monoester, 40% Diester) | Sucrose Solubility |
|---|---|---|---|
| D.M.F. | Toluene | | |
| 10 | 90 | 4.68 | 0.007 |
| 20 | 80 | 10.83 | |
| 30 | 70 | 19.39 | 0.03 |
| 40 | 60 | 31.0 | |
| 50 | 50 | 46.0 | |
| 60 | 40 | 84.8 | 0.06 |
| 70 | 30 | 120.0 | 1.70 |
| 80 | 20 | 101.0 | 3.94 |
| 90 | 10 | 65.0 | |
| 100 | 0 | 26.0 | 14.5 |

TABLE 2

| D.M.F. and Toluene Mixture Percentages | | Sucrose ester Solubility (Mixed ester of diester and triester) | Sucrose Solubility |
|---|---|---|---|
| D.M.F. | Toluene | | |
| 10 | 90 | 60.0 | 0.007 |
| 20 | 80 | 62.0 | |
| 30 | 70 | 23.5 | 0.03 |
| 40 | 60 | 5.5 | |
| 50 | 50 | 1.0 | |
| 60 | 40 | 0 | 0.06 |
| 70 | 30 | 0 | 1.70 |
| 80 | 20 | 0 | 3.94 |
| 90 | 10 | 0 | |
| 100 | 0 | 0 | 14.5 |

In the process of the present invention, the mixing ratio of D.M.F. and toluene is suitably adjusted according to composition of the reacted liquid product. For example, in the case wherein the ratio of the mono-ester and di-ester contained in the ester of the reacted liquid product is 60:40, the concentration of the toluene in the said mixed solvent of D.M.F. and toluene is selected to be 40% or in the case wherein di-ester and tri-ester predominate (for example, di-ester is over 80%), the concentration of the toluene in the mixed solvent of D.M.F. and toluene is selected to be of the order of 75 to 80 percent. Then it is possible to recover the sucrose in the form of easily-separable crystals and, moreover, with a high rate of recovery yield.

In the practical application of the process, because of such conditions as the concentration of the reaction solution and filtration, the above-indicated ratio is controlled suitably between 3 and 20 times in order to attain the most economical recovery of the sucrose. Moreover, almost the entire quantity of the toluene used can be recovered, and it has been possible to eliminate the various difficulties mentioned above.

The following examples illustrate the process of this invention. It is, of course, to be understood that these examples are only illustrative and are not intended to limit the scope of the invention.

Example 1

A reaction solution containing 17.2 grams of fatty acid sucrose ester (ratio of monoester to diester, 6:4), 25.3 grams of unreacted sucrose, 57.5 grams of dimethylformamide, and a catalyst was heated to 85° C., and 38.3 grams of toluene (40 percent concentration of toluene in D.M.F.—toluene mixed solvent) were gradually added, whereby sucrose was crystallized. When toluene is added, it is necessary to maintain the temperature of the mixture or to heat the mixture in order to prevent decrease of the temperature, and to continue violent stirring so as to make toluene distribution sufficiently uniform. The batch was cooled to 30° C., the said crystals were separated out by filtration and dried, whereupon 24.44 grams of sucrose were obtained. The recovery of the sucrose in this case was 96.6 percent. It is a secondary step to cool the mixture to 30° C. after addition, said cooling being adopted to prevent loss of the volatile toluene during the next filtration operation, to assure safety, and to obtain uniformity of the already crystallized sucrose crystals. According to adoption of such process as described above, sucrose crystals become uniform, whereby the filtration operation becomes very easy.

Example 2

A reaction solution containing 1.76 kilograms of fatty acid sucrose ester (a mixture of diester and triester), 3.04 kilograms of unreacted sucrose, 4.8 kilograms of dimethylformamide, and a catalyst was heated to 80° C., and 19.2 kilograms of toluene (80 percent concentration of toluene in D.M.F.—toluene mixed solvent) were added gradually, whereby sucrose was crystallized. When toluene is added, it is necessary to maintain the temperature of the mixture or to heat the mixture in order to prevent decrease of the temperature, and to continue violent stirring so as to make toluene distribution sufficiently uniform. When said crystals were separated out by filtration and dried at 30° C. as described in Example 1, 2.99 kilograms of sucrose were obtained. The sucrose recovery in this case was 98.3 percent. If the reaction solution is cooled without addition of toluene, the solid material produced contains not only sucrose but also sucrose ester and their separation is hardly possible. According to this, it is recognized that recovery of sucrose is very inferior when mere cooling is carried out. We could not also obtain effective separation in the course of a plurality of experiments.

Since it is obvious that many changes and modifications can be made in the above-described details without departing from the nature and spirit of the invention, it is to be understood that the invention is not to be limited to the details described herein except as set forth in the appended claims.

I claim:

1. In the process for the recovery of sucrose from a reaction solution containing sucrose ester, free sucrose, an alkaline catalyst and a solvent, and prepared by the reaction of sucrose with methyl-fatty-acid esters containing 6 to 30 carbon atoms in the fatty acid moiety in the presence of a catalyst in dimethylformamide, at a temperature of 60–120° C., in a vacuum while, with the progression of the reaction, distilling out the methyl alcohol and dimethylformamide, the improvement comprising mixing the said reaction solution with toluene in a quantity from between 20–95% by weight based on the resulting dimethylformamide-toluene mixed solvent at a temperature of about 80–85° C., the amount of toluene being sufficient to render the sucrose substantially insoluble in the said reaction solution, while at the same time sufficing to dissolve a substantial amount of sucrose ester in said reaction solution; thereby causing crystallization of the sucrose, cooling the mixture to about 30° C., and separating the sucrose from the mixture by ordinary separation method.

2. A process as defined in claim 1, wherein the sucrose ester is composed of about 60% monoester and about 40% diester by weight, and wherein the reaction solution is mixed with toluene in a quantity of about 40% of weight, based on the resulting dimethylformamide-toluene mixed solvent.

3. A process as defined in claim 1, wherein the said sucrose ester is a mixture of diester and triester and wherein the reaction solution is mixed with toluene in a quantity of about 75 to 80% by weight, based on the resulting dimethylformamide-toluene mixed solvent.

References Cited by the Examiner
UNITED STATES PATENTS 2,893,990 7/1959 Hass et al. _____ 260—234
2,948,716 8/1960 Davis _____ 260—234
3,057,743 10/1962 Touey et al. _____ 260—234

LEWIS GOTTS, Primary Examiner.

CHARLES B. PARKER, Examiner.